US006590015B1

(12) United States Patent
Eckel et al.

(10) Patent No.: US 6,590,015 B1
(45) Date of Patent: *Jul. 8, 2003

(54) FLAME-RESISTANT MOLDING COMPOUNDS

(75) Inventors: Thomas Eckel, Dormagen (DE); Dieter Wittmann, Köln (DE); Horst Beicher, Tönisvorst (DE)

(73) Assignee: Bayer Aktiengesellschaft, Leverkusen (DE)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/368,244

(22) Filed: Jan. 3, 1995

Related U.S. Application Data

(63) Continuation of application No. 08/134,001, filed on Oct. 12, 1993, now abandoned.

(30) Foreign Application Priority Data

Oct. 22, 1992 (DE) .......................................... 42 35 642

(51) Int. Cl.[7] .......................... C08L 69/00; C08K 5/523
(52) U.S. Cl. ...................... 524/127; 524/125; 524/126; 525/67
(58) Field of Search ................................ 524/125, 126, 524/127

(56) References Cited

U.S. PATENT DOCUMENTS

| 4,983,658 A | | 1/1991 | Kress et al. ................... 525/67 |
| 5,030,675 A | | 7/1991 | Wittmann et al. ........... 524/141 |
| 5,240,978 A | * | 8/1993 | Fuhr ............................ 525/67 |
| 5,272,193 A | * | 12/1993 | Fuhr ........................... 524/126 |

FOREIGN PATENT DOCUMENTS

| EP | 186011 | 2/1986 | |
| EP | 305816 | 3/1989 | |
| EP | 0 363 608 | 4/1990 | |
| JP | 202240 | * 11/1984 | ................. 524/127 |
| WO | WO 86/04078 | 7/1986 | |
| WO | WO 90/03417 | 4/1990 | |

OTHER PUBLICATIONS

Polymer & General Chemistry, J5 9202–240–A.

Textiles: Paper: Cellulose, J5 9193–920–A.

* cited by examiner

*Primary Examiner*—David J. Buttner
(74) *Attorney, Agent, or Firm*—Connolly Bove Lodge & Hutz LLP

(57) ABSTRACT

The invention relates to flame-resistant poly-carbonate/ABS molding compounds which are considerably improved in their mechanical properties and thermal stability by an addition of polyalkylene terephthalate and an oligomeric phosphate.

6 Claims, No Drawings

FLAME-RESISTANT MOLDING COMPOUNDS

This application is a continuation, of application Ser. No. 08/134,001 filed on Oct. 12, 1993 now abandoned.

This invention relates to flame-resistant poly-carbonate/ABS molding compounds which are considerably improved in their mechanical properties and thermal stability by an addition of polyalkylene terephthalate and an oligomeric phosphate.

EP-A 0 174 493 (U.S. Pat. No. 4,983,658) describes flame-proofed halogen-containing polymer blends of aromatic polycarbonate, styrene-containing graft copolymer, monophosphates and a special polytetrafluoroethylene formulation. Although these blends show adequate burning behavior and mechanical properties, the surface quality of moldings produced from them can be impaired at high processing temperatures. In addition, deficiencies can arise in their resistance to stress cracking.

U.S. Pat. No. 5,030,675 describes flame-resistant thermo-plastic molding compounds of aromatic polycarbonate, ABS polymer, polyalkylene terephthalate and monophosphates with fluorinated polyolefins as flame-proofing additives. However, the high resistance to stress cracking is offset by disadvantages in the form of deficiencies in notched impact strength and inadequate heat resistance on exposure to high temperatures, for example during processing.

Diphosphates are known as flameproofing additives. JA 59 202 240 describes the production of one such product from phosphorus oxychloride, diphenols, such as hydroquinone or bisphenol A, and monophenols, such as phenol or cresol. These diphosphates may be used as flameproofing agents in polyamide or poly-carbonate. However, there is no reference in this document to an improvement in heat resistance and notched impact strength by addition of the oligomeric phosphate in conjunction with polyalkylene terephthalates to polycarbonate molding compounds.

EP-A 0 363 608 describes polymer blends of aromatic polycarbonate, styrene-containing copolymer or graft copolymer and oligomeric phosphates as flameproofing additives. The stress cracking resistance of these blends is often too low for the production of thin-walled housing parts.

According to JP 59 193 920, flame-resistant polyesters, such as polyalkylene terephthalates, are obtained by polycondensation of ethylene glycol, terephthalic acid and hydroquinone diphosphate in the presence of antimony oxide, cobalt acetate and inorganic phosphates. However, the blends described in this document show a mechanical property level that is inadequate for numerous applications in the information field. In addition, the use of heavy metals makes the molding compounds in question difficult to reuse.

It has now surprisingly been found that flame-resistant polycarbonate/ABS molding compounds, which combine excellent notched impact strength and stress cracking resistance with very high heat resistance under processing conditions, can be produced providing an additive combination of a polyalkylene terephthalate and an oligomeric phosphate is added. These molding compounds are particularly suitable for the production of thin-walled moldings (housing parts in the field of data processing equipment) where high processing temperatures and pressures impose severe strains on the material used.

The present invention relates to flame-resistant thermoplastic molding compounds of A) 40 to 98 parts by weight, preferably 50 to 95 parts by weight and more preferably 60 to 90 parts by weight of an aromatic polycarbonate, B) 0.5 to 40 parts by weight, preferably 1 to 30 parts by weight and more preferably 2 to 10 parts by weight of a polyalkylene terephthalate, C) 0.5 to 40 parts by weight, preferably 1 to 20 parts by weight and more preferably 2 to 12 parts by weight of a graft polymer, D) 0.5 to 20 parts by weight, preferably 1 to 18 parts by weight and more preferably 2 to 15 parts by weight of an oligomeric phosphorus compound corresponding to formula (I)

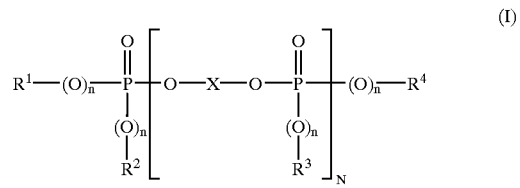

in which $R^1$, $R^2$, $R^3$ and $R^4$ independently of one another represent $C_{1-8}$ alkyl, $C_{5-6}$ cycloalkyl, $C_{6-10}$ aryl or $C_{7-12}$ aralkyl, the n's independently of one another are 0 or 1, N is a value between 0.5 and 5 and X is a mononuclear or polynuclear aromatic radical containing 6 to 30 carbon atoms, and E) 0.05 to 5 parts by weight, preferably 0.1 to 1 part by weight and more preferably 0.1 to 0.5 part by weight of a fluorinated polyolefin having a mean particle diameter of 0.05 to 1000 μm, a density of 1.2 to 2.3 g/cm³ and a fluorine content of 65 to 76% by weight.

The sum of all the parts by weight A+B+C+D+E is 100.

COMPONENT A

Thermoplastic aromatic polycarbonates A suitable for use in accordance with the invention are those based on diphenols corresponding to formula (II)

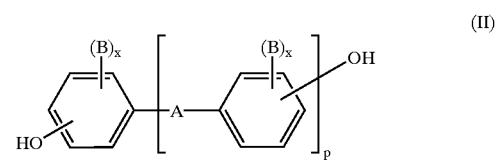

in which

A is a single bond, $C_{1-5}$ alkylene, $C_{2-5}$ alkylidene, $C_{5-6}$ cycloalkylidene, —S— or —$SO_2$—, B is chlorine or bromine, x=0, 1 or 2 and p=1 or 0, or alkyl-substituted dihydroxyphenyl cycloalkanes corresponding to formula (III)

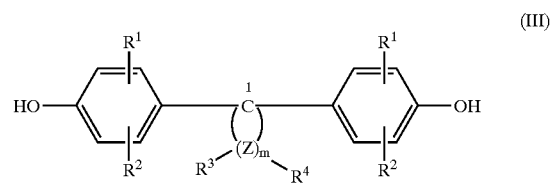

in which $R^1$ and $R^2$ independently of one another represent hydrogen, halogen, preferably chlorine or bromine, $C_{1-8}$ alkyl, $C_{5-6}$ cycloalkyl, $C_{6-10}$ aryl, preferably phenyl, and $C_{7-12}$ aralkyl, preferably phenyl-$C_{1-4}$—alkyl, more particularly benzyl, m is an integer of 4 to 7, preferably 4 or 5, $R^3$ and $R^4$ may be individually selected for each Z and, independently of one another, represent hydrogen or $C_{1-6}$ alkyl and z represents carbon, with the proviso that, at at least one atom Z, $R^3$ and $R^4$ can both be alkyl.

Suitable diphenols corresponding to formula (II) are, for example, hydroquinone, resorcinol, 4,4'-dihydroxydiphenyl, 2,2-bis-(4-hydroxyphenyl)-propane, 2,4-bis-(4-hydroxyphenyl)-2-methyl butane, 1,1-bis-(4-hydroxyphenyl)-cyclohexane, 2,2-bis-(3-chloro-4-hydroxyphenyl)-propane, 2,2-bis-(3,5-dibromo-4-hydroxyphenyl)-propane.

Preferred diphenols (II) are 2,2-bis-(4-hydroxy-phenyl)-propane, 2,2-bis-(3,5-dichloro-4-hydroxyphenyl)-propane and 1,1-bis-(4-hydroxyphenyl)-cyclohexane.

Preferred diphenols (III) are 1,1-bis-(4-hydroxy-phenyl)-3,3-dimethyl cyclohexane, 1,1-bis-(4-hydroxy-phenyl)-3,3,5-trimethyl cyclohexane and 1,1-bis-(4-hydroxyphenyl)-2,4,4-trimethyl cyclopentane.

Polycarbonates suitable for the purposes of the invention are both homopolycarbonates and copolycarbonates.

A may also be a mixture of the thermoplastic polycarbonates defined above.

Polycarbonates may be obtained in known manner from diphenols with phosgene by the interfacial process or with phosgene by the process in homogeneous phase, the so-called pyridine process. Their molecular weight may be regulated in known manner by a suitable quantity of known chain terminators.

Suitable chain terminators are, for example, phenol, p-chlorophenol, p-tert.butyl phenol or 2,4,6-tribromophenol and also long-chain alkylphenols, such as 4-(1,3-tetramethylbutyl)-phenol according to DE-OS 2 842 005 (Le A 19 006) or monoalkylphenol or dialkylphenol containing a total of 8 to 20 carbon atoms in the alkyl substituents according to German patent application P 35 06 472.2 (Le A 23 654), such as 3,5-di-tert.butylphenol, p-isooctylphenol, p-tert.octylphenol, p-dodecylphenol and 2-(3,5-dimethylheptyl)-phenol and 4-(3,5-dimethylheptyl)-phenol.

The chain terminators are generally used in a quantity of 0.5 to 10 mol-%, based on the sum of the diphenols (I) and/or (II) used.

The polycarbonates A suitable for the purposes of the invention have average molecular weights ($\overline{M}w$, weight average, as measured for example by ultracentrifugation or scattered light measurement) in the range from 10,000 to 200,000 and preferably in the range from 20,000 to 80,000.

The polycarbonates A suitable for the purposes of the invention may be branched in known manner, preferably by the incorporation of 0.05 to 2 mol-%, based on the sum of the diphenols used, of trifunctional or more than trifunctional compounds, for example those containing three or more than three phenolic groups.

Besides bisphenol A homopolycarbonate, preferred polycarbonates are the copolycarbonates of bisphenol A with up to 15 mol-%, based on the total mols of diphenols used, of 2,2-bis-(3,5-dibromo-4-hydroxyphenyl)-propane and the copolycarbonates of bisphenol A with up to 60 mol-%, based on the total mols of diphenols, of 1,1-bis-(4-hydroxyphenyl)-3,3,5-trimethyl cyclohexane.

The polycarbonates A may be completely or partly replaced by aromatic polyester carbonates.

COMPONENT B

Polyalkylene terephthalates B) in the context of the invention are reaction products of aromatic dicarboxylic acids or reactive derivatives thereof (for example dimethyl esters or anhydrides) and aliphatic, cycloaliphatic or araliphatic diols and mixtures of these reaction products. They may be produced by known methods (Kunststoff-Handbuch, Vol. VIII, pages 695 et seq., Carl Hanser-Verlag, München, 1973).

In addition to terephthalic acid units, preferred polyalkylene terephthalates B) may contain up to 20 mol-% units of other aromatic or cycloaliphatic dicarboxylic acids containing 8 to 14 carbon atoms or of aliphatic dicarboxylic acids containing 4 to 12 carbon atoms, such as units of phthalic acid, isophthalic acid, 2,6-naphthalene dicarboxylic acid, 4,4'-diphenyl dicarboxylic acid, succinic acid, adipic acid, sebacic acid, azelaic acid and/or cyclohexane diacetic acid.

In addition to ethylene glycol or 1,4-butanediol units, the preferred polyalkylene terephthalates B) may contain up to 20 mol-% and preferably up to 10 mol-% of other aliphatic diols containing 3 to 12 carbon atoms or of cycloaliphatic diols containing 6 to 21 carbon atoms, for example units of 1,3-propanediol, 2-ethyl-1,3-propanediol, neopentyl glycol, 1,5-pentanediol, 1,6-hexanediol, cyclohexane-1,4-dimethylol, 3-ethyl-2,4-pentanediol, 2-methyl-2,4-pentanediol, 2,2,4-trimethyl-1,4- and-1,6-pentanediol, 2-ethyl-1,3-hexanediol, 2,2-diethyl-1,3-propanediol, 2,5-hexanediol, 1,4-di-(β-hydroxyethoxy)-benzene, 2,2-bis-(4-hydroxycyclohexyl)-propane, 2,4-dihydroxy-1,1,3,3-tetramethyl cyclobutane, 2,2-bis-(3-β-hydroxyethoxyphenyl)-propane and/or 2,2-bis-(4-hydroxypropoxyphenyl)-propane (DE-OS 24 07 647, 24 07 776, 27 15 932).

The polyalkylene terephthalates B) may be branched by incorporation of relatively small quantities of trihydric or tetrahydric alcohols or tribasic or tetrabasic carboxylic acids, as described for example in DE-OS 19 00 270 and in U.S. Pat. No 3,692,744. Examples of preferred branching agents are trimesic acid, trimellitic acid, trimethylol ethane and propane and/or pentaerythritol.

Polyalkylene terephthalates B) which have been produced solely from terephthalic acid or reactive derivatives thereof (for example dialkyl esters) and ethylene glycol and/or 1,4-butanediol (polyethylene and polybutylene terephthalate) and mixtures of these polyalkylene terephthalates are particularly preferred.

The polyalkylene terephthalates preferably used as component B) generally have an intrinsic viscosity of C 4 to 1.5 dl/g, preferably 0.5 to 1.3 dl/g and more Preferably 0.6 to 1.2 dl/g, as measured in phenol/odichlorobenzene (1:1 parts by weight) at 25° C.

COMPONENT C

The graft polymers C) comprise, for example, graft copolymers having rubber-elastic properties which may essentially be obtained from at least two of the following monomers: chloroprene, 1,3-butadiene, isoprene, styrene, acrylonitrile, ethylene, propylene, vinyl acetate and (meth) acrylates containing 1 to 18 carbon atoms in the alcohol component; i.e. polymers of the type described, for example, in "Methoden der Organischen Chemie" (Houben-Weyl), Vol. 14/1, Georg Thieme-Verlag, Stuttgart 1961, pages 393 to 406 and in C. B. Bucknall, "Toughened Plastics", Appl. Science Publishers, London 1977. Preferred polymers C) are partly crosslinked and have gel contents above 20% by weight, preferably above 40% by weight and, more preferably, above 60% by weight.

Preferred graft polymers C) comprise graft polymers of:
C.1) 5 to 95 parts by weight and preferably 30 to 80 parts by weight of a mixture of
C.1.1) 50 to 95 parts by weight styrene, α-methyl styrene, halogen- or methyl-nucleus-substituted styrene, $C_{1-8}$ alkyl methacrylate, more particularly methyl methacrylate, $C_{1-8}$ alkyl acrylate, more particularly methyl acrylate, or mixtures of these compounds and C.1.2) 5 to 50 parts by weight acrylonitrile, methacrylonitrile, $C_{1-8}$ alkyl methacrylates, more particularly methyl methacrylate, $C_{1-8}$ alkyl acrylate, more particularly methyl acrylate, maleic anhydride, $C_{1-4}$-alkyl- or phenyl-N-substituted maleic imides or mixtures of these compounds on C.2) 5 to 95 parts by weight and preferably 20 to 70 parts by weight polymer having a glass transition temperature below −10° C.

Preferred graft polymers C) are, for example, polybutadienes, butadiene/styrene copolymers and acrylate rubbers grafted with styrene and/or acrylonitrile and/or alkyl (meth)acrylates; i.e. copolymers of the type described in DE-OS 1 694 173 (=U.S. Pat No. 3,564,077); polybutadienes, butadiene/styrene or butadiene/acrylonitrile copolymers, polyisobutenes or polyisoprenes g rafted with alkyl (meth)acrylates, vinyl acetate, acrylonitrile, styrene and/or alkyl styrenes as described, for example, in DE-OS 2 348 377 (=U.S. Pat. No. 3,919,353).

Particularly preferred polymer s C) are, for example, ABS polymers of the type described, for example, in DE-OS 2 035 390 (=U.S. Pat. No. 3,644,574) or in DE-OS 2 248 242 (=GB-PS 1,409,275).

Particularly preferred graft polymers C) are graft polymers obtainable by grafting I. 10 to 70, preferably 15 to 50 and more preferably 20 to 40% by weight, based on the graft product, of at least one (meth)acrylate or 10 to 70, preferably 15 to 50 and more preferably 20 to 40% by weight of a mixture of 10 to 50 and preferably 20 to 35% by weight, based on the mixture, of acrylonitrile or (meth)acrylates and 50 to 90% by weight and preferably 65 to 80% by weight, based on the mixture, of styrene onto II. 30 to 90, preferably 50 to 85 and more preferably 60 to 80% by weight, based on the graft product, of a butadiene polymer containing at least 50% by weight, based on II, butadiene units as the graft base, the gel content of the graft base II preferably being at least 70% by weight (as measured in toluene), the degree of grafting G preferably being 0.15 to 0.55 and the average particle diameter $d_{50}$ of the graft polymer C) preferably being 0.05 to 2 and, more preferably, 0.1 to 0.6 μm.

(Meth)acrylates I are esters of acrylic acid or methacrylic acid and monohydric alcohols containing 1 to 18 carbon atoms. Methyl, ethyl and propyl methacrylate are particularly preferred.

In addition to butadiene units, the graft base II may contain up to 50% by weight, based on II, of units of other ethylenically unsaturated monomers such as styrene, acrylonitrile, esters of acrylic or methacrylic acid containing 1 to 4 carbon atoms in the alcohol component (such as methyl acrylate, ethyl acrylate, methyl methacrylate, ethyl methacrylate), vinyl esters and/or vinyl ethers. The preferred graft base II consists of pure polybutadiene.

Since the graft monomers are not necessarily grafted completely onto the graft base in the grafting reaction, graft polymers C) in the context of the invention also include products obtained by polymerization of the graft monomers in the presence of the graft base.

The degree of grafting G is the ratio by weight of graft monomers grafted onto the graft base and is dimensionless.

The mean particle size $d_{50}$ is the diameter above which 50% by weight and below which 50% by weight of the particles lie. It may be determined by ultracentrifuge measurements (W. Scholtan, H. Lange, Kolloid Z. und Z. Polymere 250 (1972), 782–796).

Other particularly preferred graft polymers C) are, for example, graft polymers of
(a) 20 to 90% by weight, based on C), acrylate rubber having a glass transition temperature below −20° C. as the graft base and
(b) 10 to 80% by weight, based on C), of at least one polymerizable ethylenically unsaturated monomer, of which the homopolymer(s) or copolymer(s) formed in the absence of a) would have a glass transition temperature above 25° C., as the graft monomers.

The acrylate rubbers (a) of the polymers C) are preferably polymers of alkyl acrylates, optionally with up to 40% by weight, based on (a), of other polymerizable ethylenically unsaturated monomers. Preferred polymerizable acrylates include $C_{1-8}$ alkyl acrylates, preferably methyl, ethyl, n-butyl, n-octyl and 2-ethylhexyl acrylate; haloalkyl acrylates, preferably halo-$C_{1-8}$-alkyl acrylates, such as chloroethyl acrylate, and mixtures of these monomers.

For crosslinking, monomers containing more than one polymerizable double bond may be copolymerized. Preferred examples of crosslinking monomers are esters of unsaturated monocarboxylic acids containing 3 to 8 carbon atoms and unsaturated monohydric alcohols containing 3 to 8 carbon atoms and unsaturated monohydric alcohols containing 3 to 12 carbon atoms or saturated polyols containing 2 to 4 OH groups and 2 to 20 carbon atoms, such as for example ethylene glycol dimethacrylate, allyl methacrylate; polyunsaturated heterocyclic compounds, such as for example trivinyl and triallyl cyanurate; polyfunctional vinyl compounds, such as divinyl and trivinyl benzenes; and also triallyl phosphate and diallyl phthalate.

Preferred crosslinking monomers are allyl methacrylate, ethylene glycol dimethacrylate, diallyl phthalate and heterocyclic compounds containing at least three ethylenically unsaturated groups.

Particularly preferred crosslinking monomers are the cyclic monomers triallyl cyanurate, triallyl isocyanurate, trivinyl cyanurate, triacryloyl hexahydro-striazine, triallyl benzenes.

The quantity of crosslinking monomers is preferably 0.02 to 5% by weight and more preferably 0.05 to 2% by weight, based on the graft base (a).

In the case of cyclic crosslinking monomers containing at least three ethylenically unsaturated groups, it is of advantage to limit the quantity to less than 1% by weight of the graft base (a).

Preferred "other" polymerizable ethylenically unsaturated monomers, which may optionally be used in addition to the acrylates for the production of the graft base (a), are for example acrylonitrile, styrene, α-methyl styrene, acrylamides, vinyl-$C_{1-6}$-alkyl ethers, methyl methacrylate, butadiene. Preferred acrylate rubbers as the graft base (a) are emulsion polymers which have a gel content of at least 60% by weight.

Other suitable graft bases are silicone rubbers having grafting-active sites of the type described in DE 37 04 657, DE 37 04 655, DE 36 31 540 and DE 36 31 539.

The gel content of the graft base (a) is determined at 25° C. in dimethyl formamide (M. Hoffmann, H. Krömer, R. Kuhn, Polymeranalytik I und II, Georg ThiemeVerlag, Stuttgart 1977).

The aqueous dispersions of graft polymer C) used for the preferred embodiment of co-precipitation with the tetrafluoroethylene polymer E) generally have solids contents of 25 to 60% by weight and preferably 30 to 45% by weight.

COMPONENT D

The polymer blends according to the invention contain an oligomeric phosphate corresponding to formula (I)

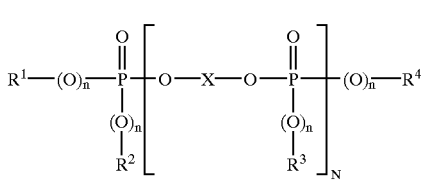

as flameproofing agent. In formula (I), $R^1$, $R^2$, $R^3$ and $R^4$ independently of one another represent $C_{1-8}$ alkyl, $C_{5-6}$ cycloalkyl, $C_{6-10}$ aryl or $C_{7-12}$ aralkyl, preferably $C_{6-10}$ aryl or $C_{7-12}$ aralkyl. The aromatic groups $R^1$, $R^2$, $R^3$ and $R^4$ may in turn be substituted by halogen atoms or alkyl groups. Particularly preferred aryl radicals are cresyl, phenyl, xylenyl, propylphenyl or butylphenyl and also the brominated and chlorinated derivatives thereof.

X in formula (I) is a mononuclear or polynuclear aromatic radical containing 6 to 30 carbon atoms derived from diphenols, such as for example bisphenol A, resorcinol or hydroquinone or even chlorinated or brominated derivatives thereof.

The n's in formula (I) independently of one another may be 0 or 1, preferably 1.

N may assume a value between 0.5 and 5, preferably a value between 1 and 2. Mixtures of various oligomeric phosphates may also be used as component D according to the invention. In this case, N has an average value between 0.5 and 5

COMPONENT E

The fluorinated polyolefins E) are of high molecular weight and have glass transition temperatures above –30° C. and generally above 100° C., fluorine contents of, preferably, 65 to 76% by weight and, more preferably, 70 to 76% by weight, mean particle diameters $d_{50}$ of 0.05 to 1000 μm and preferably 0.08 to 20 μm. In general, the fluorinated polyolefins E) have a density of 1.2 to 2.3 g/cm³. Preferred fluorinated polyolefins E) are polytetrafluoroethylene, polyvinylidene fluoride, vtetrafluoroethylene/hexafluoropropylene and ethylene/tetrafluoroethylene copolymers. The fluorinated polyolefins are known (cf. "Vinyl and Related Polymers" by Schildknecht, John Wiley & Sons, Inc., New York, 1962, pages 484–494; "Fluorpolymers" by Wall, Wiley Interscience, John Wiley & Sons, Inc., New York, Vol. 13, 1970, pages 623–654; "Modern Plastics Encyclopedia", 1970–1971, Vol. 47, No. 10 A, October 1970, Mcdraw-Hill, Inc., New York, pages 134 and 774; "Modern Plastics Encyclopedia", 1975–1976, October 1975, Vol. 52, No. 10 A, McGraw-Hill, Inc., New York, pages 27, 28 and 472 and U.S. Pat. Nos. 3,671,487, 3,723, 373 and 3,838,092).

They may be produced by known methods, for example by polymerization of tetrafluoroethylene in aqueous medium with a catalyst that forms free radicals, for example sodium, potassium or ammonium peroxydisulfate, under pressures of 7 to 71 kg/cm² and at temperatures of 0 to 200° C. and preferably at temperatures of 20 to 100°C. (for further particulars, see for example U.S. Pat. No. 2,393,967). Depending on the form in which they are used, these materials may have a density of 1.2 to 2.3 g/cm³ and a mean particle size of 0.05 to 1000 μm.

Fluorinated polyolefins E) preferred for the purposes of the invention are tetrafluoroethylene polymers and have mean particle diameters of 0.05 to 20 μm and preferably 0.08 to 10 μm and a density of 1.2 to 1.9 g/cm³ and are preferably used in the form of a coagulated mixture of emulsions of the tetrafluoroethylene polymers E) with emulsions of the graft polymers C).

Suitable fluorinated polyolefins E) useable in powder form are tetrafluoroethylene polymers having mean particle diameters of 100 to 1000 μm and densities of 2.0 g/cm³ to 2.3 g/cm³.

To prepare a coagulated mixture of C) and E), an aqueous emulsion (latex) of a graft polymer C) having average latex particle diameters of 0.05 to 2 μm and, more particularly, 0.1 to 0.6 μm is first mixed with a fine-particle emulsion of a tetrafluoroethylene polymer E) in water having average particle diameters of 0.05 to 20 μm and, more particularly, 0.08 to 10 μm. Suitable tetrafluoroethylene polymer emulsions typically have solids contents of 30 to 70% by weight and, more particularly, 50 to 60% by weight. The emulsions of the graft polymers C) have solids contents of 25 to 50% by weight and preferably 30 to 45% by weight.

The quantities mentioned in the description of component C include the percentage content of graft polymer for the coagulated mixture of graft polymer and fluorinated polyolefins.

In the emulsion mixture, the ratio by weight of graft polymer C) to the tetrafluoroethylene polymer E) is 95:5 to 60:40. The emulsion mixture is then coagulated in known manner, for example by spray drying, freeze drying or coagulation by addition of inorganic or organic salts, acids, bases or organic water-miscible solvents, such as alcohols, ketones, preferably at temperatures in the range from 20 to 150° C. and more particularly at temperatures in the range from 50 to 100° C. If necessary, the coagulated mixture may be dried at 50 to 200° C. and preferably at 70 to 100° C.

Suitable tetrafluoroethylene polymer emulsions are commercially available products and are marketed, for example, by DuPont as Teflon® 30 N.

The molding compounds according to the invention may contain typical additives, such as lubricants and mold release agents, nucleating agents, antistatic agents, stabilizers, fillers and reinforcing materials and also dyes and pigments.

The filled or reinforced molding compounds may contain up to 60% by weight and preferably from 10 to 40% by weight, based on the filled or reinforced molding compound, of fillers and/or reinforcing materials. Preferred reinforcing materials are glass fibers. Preferred fillers, which may also have a reinforcing effect, are glass beads, mica, silicates, quartz, talcum, titanium dioxide, wollastonite.

The molding compounds according to the invention consisting of components A to E and optionally other known additives, such as stabilizers, dyes, pigments, lubricants and mold release agents, fillers and reinforcing materials, nucleating agents and antistatic agents are produced by mixing the constituents in known manner and melt-compounding or melt-extruding the resulting blend at temperatures of 200 to 330° C. in typical units, such as internal mixers, single-screw and twin-screw extruders, component E) preferably being used in the form of the already mentioned coagulated mixture.

Accordingly, the present invention also relates to a process for the production of thermoplastic molding compounds consisting of components A to E and, optionally, stabilizers, dyes, pigments, lubricants and mold release agents, fillers and reinforcing materials, nucleating agents and antistatic agents, characterized in that components A to E and, optionally, stabilizers, dyes, pigments, flow promoters, fillers and reinforcing materials, lubricants and mold release agents, nucleating agents and/or antistatic agents, are mixed and the resulting blend is melt-compounded or melt-extruded in standard units at temperatures of 200 to 330° C., component E preferably being used in the form of a coagulated mixture with component C.

The individual constituents may be mixed both successively and simultaneously either at around 20° C. (room temperature) or at higher temperatures.

The molding compounds according to the invention may be used for the production of moldings of any kind. More particularly, moldings may be produced by injection molding. Examples of such moldings are housing parts of any kind, for example for domestic appliances, such as juice presses, coffee machines, mixers, for office machines, or cover panels for the building industry and automotive parts. In addition, they may be used in the field of electrical engineering because the have very favorable electrical properties.

The molding compounds are particularly suitable for the production of thin-walled moldings (for example housing parts of data processing equipment) where the plastics used have to meet particularly stringent requirements in regard to notched impact strength and stress cracking resistance.

Another form of processing is the production of moldings by thermoforming from prefabricated machines or films.

EXAMPLES

COMPONENT A

Bisphenol A polycarbonate having a relative solution viscosity of 1.26 to 1.28, as measured in methylene chloride at 25° C. and at a concentration of 0.5 g/100 ml.

COMPONENT B

Linear polyethylene terephthalate having an intrinsic viscosity I.V. of 0.85 dl/g, as measured in phenol/odichlorobenzene (1:1) at 25° C. and at a concentration of 0.5 g/dl (Melinar B 90 S, a product of ICI).

COMPONENT C

Graft polymer of 45 parts by weight styrene and acrylonitrile in a ratio of 72:28 on 55 parts by weight particulate crosslinked polybutadiene rubber (mean particle diameter $d_{50}=0.4$ μm) prepared by emulsion polymerization.

COMPONENT D m-Phenylene bis-(diphenylphosphate) (Fyroflex RDP, a product of Akzo)

COMPONENT E

Tetrafluoroethylene polymer in the form of a coagulated mixture of an SAN graft polymer emulsion C) in water and a tetrafluoroethylene polymer emulsion in water. The ratio by weight of graft polymer C) to the tetrafluoroethylene polymer E) in the mixture is 90% by weight to 10% by weight. The tetrafluoroethylene polymer emulsion has a solids content of 60% by weight and a mean particle diameter of 0.05 to 0.5 μm. The SAN graft polymer emulsion has a solids content of 34% by weight and a mean latex particle diameter of 0.4 μm.

Preparation of E

The emulsion of the tetraflouoroethylene polymer (Teflon 30 N, a product of DuPont) is mixed with the emulsion of the SAN graft polymer C) and stabilized with 1.8% by weight, based on polymer solids, of phenolic antioxidants. The mixture is coagulated at 85 to 95° C. with an aqueous solution of MgSO4 (Epsom salt) and acetic acid at pH 4 to 5, filtered and washed until substantially free from electrolyte, subsequently freed from most of the water by centrifugation and then dried at 100° C. to form a powder. This powder may then be compounded with the other components in the described units.

Production and Test of the Molding Compounds According to the Invention

Components A to E were mixed in a 3 liter internal mixer. The moldings were produced at 260° C. in an Arburg 270 E injection molding machine.

Notched impact strength was determined at room temperature on test specimens measuring 80×10×4 mm³ by the ISO 180 1A method.

The Vicat B softening temperature (heat resistance) was determined in accordance with DIN 53 460.

Stress cracking behavior was investigated using 80×10×4 mm³ test specimens (melt temperature 260° C.). A mixture of 60% by volume toluene and 40% by volume isopropanol was used as the test medium. The test specimens were pre-extended by means of an arcuate template and simultaneously stored for 5 minutes at room temperature in the test medium. The pre-extension $\epsilon_x$ was 0.2 to 2.4%. Stress cracking behavior was evaluated from the cracks formed or from the fracture as a function of the pre-extension.

The compositions of the tested materials and the results obtained are set out in the following Table.

The Table shows that the molding compounds have a combination of high notched impact strength and very good stress cracking resistance. There was no evidence of failure of the test specimens, even after storage for 5 minutes in the test medium. This favorable combination of properties is supported by high heat resistance and a defect-free surface.

TABLE

Composition and properties of the molding compounds

| Example | Components A B C D E [parts by weight] | | | | | $a_k$ [kJ/m²] | Vicat B 120 [° C.] | Failure at $\epsilon_x$ [%] | Surface quality[1] |
|---|---|---|---|---|---|---|---|---|---|
| 1 | 76 | 5 | 5 | 12 | 4 | 60 | 97  | 2.4[2] | + |
| 2 | 77 | 5 | 5 | 11 | 4 | 60 | 100 | 2.4[2] | + |
| 3 | 76 | 5 | 5 | 10 | 4 | 56 | 103 | 2.4[2] | + |
| 4 | 77 | 5 | 5 | 9  | 4 | 57 | 105 | 2.4[2] | + |

[1]+ Light natural color, no surface defects
− Darker natural color, surface defects
[2]Unbroken after 5 minutes

What is claimed is:

1. A flame-resistant thermoplastic molding compound consisting of:

(A) 40 to 98 parts by weight of an aromatic polycarbonate;

(B) 0.5 to 40 parts by weight of a polyalkylene terephthalate;

(C) 0.5 to 40 parts by weight of a graft polymer;

(D) 0.5 to 20 parts by weight of one or more oligomeric phosphorus compounds corresponding to formula (I)

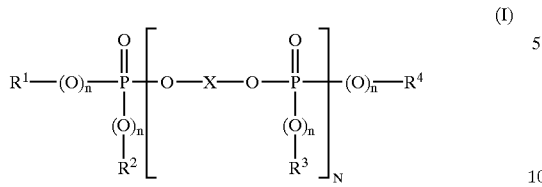

in which
R$^1$, R$^2$, R$^3$ and R$^4$ independently of one another represent C$_{1-8}$ alkyl, C$_{5-6}$ cycloalkyl, C$_{6-10}$ aryl or C$_{7-12}$ aralkyl,
the n's independently of one another are 0 or 1,
N is a value between 0.5 and 5 and
X is a mononuclear or polynuclear aromatic radical derived from the group consisting of bisphenol A, resorcinol, hydroquinone, and chlorinaqted or brominated derivatives thereof;
(E) 0.05 to 5 parts by weight of a fluorinated polyolefin having a mean particle diameter of 0.05 to 1000 μm, a density of 1.2 to 2.3 g/cm$^3$ and a fluorine content of 65 to 76% by weight; and
(F) optionally additives selected from the group consisting of stabilizers, dyes, pigments, lubricants and mold release agents, fillers and reinforcing materials selected from the group consisting of glass fibers, glass beads, mica, silicates, quartz, talcum, titanium dioxide, and wallastonite, nucleating agents and antistatic agents, wherein, when the composition is molded as an 80×10×4 mm$^3$ test specimen, the resultant molding does not crack after 5 minutes at a pre-extension of 2.4% in a test medium of 60% by volume toluene and 40% by volume isopropanol.

2. A molding compound as claimed in claim 1 containing 50 to 95 parts by weight of A), 1 to 30 parts by weight of B), and 2 to 15 parts by weight of D).

3. A molding compound as claimed in claim 1 wherein the graft polymer C) is a graft polymer produced by copolymerization of a mixture of styrene, α-methyl styrene, halogen- or alkyl-nucleus-substituted styrene, C$_{1-8}$ alkyl methacrylate, C$_{1-8}$ alkyl acrylate, or mixtures of these compounds, with acrylonitrile, methacrylonitrile, C$_{1-8}$ alkyl methacrylate, C$_{1-8}$ alkyl acrylate, maleic anhydride, C$_{1-4}$-alkyl- or phenyl-N-substituted maleic imide, or mixtures of these compounds onto a rubber having a glass transition temperature below −10° C.

4. A molding compound as claimed in claim 3 wherein the rubber is a diene rubber, acrylate rubber, silicone rubber, or ethylene/propylene/diene rubber.

5. A molding compound as claimed in claim 1 wherein, in the formula of oligomeric phosphorus compound D), R$^1$, R$^2$, R$^3$, R$^4$ represent phenyl groups.

6. A molding produced from the molding compound of claim 1.

* * * * *